United States Patent [19]
Williams

[11] Patent Number: 5,375,159
[45] Date of Patent: Dec. 20, 1994

[54] SYSTEM AND METHOD FOR REMOTE TESTING AND PROTOCOL ANALYSIS OF COMMUNICATION LINES

[75] Inventor: Clifton B. Williams, Richmond, Va.

[73] Assignee: C & P of Virginia, Richmond, Va.

[21] Appl. No.: 953,173

[22] Filed: Sep. 29, 1992

[51] Int. Cl.$^5$ .......................... H04M 3/22; H04J 1/16
[52] U.S. Cl. ...................................... 379/23; 379/22; 379/29; 370/13; 370/17
[58] Field of Search .............................. 379/16, 22–26; 370/13, 17; 371/20.1

[56] References Cited

U.S. PATENT DOCUMENTS

| | | |
|---|---|---|
| 4,001,559 | 1/1977 | Osborne et al. .................. 379/22 |
| 4,156,798 | 5/1979 | Doelz . |
| 4,260,859 | 4/1981 | Aaroen .............................. 379/22 |
| 4,967,288 | 10/1990 | Mizutori et al. . |
| 4,974,254 | 11/1990 | Perine et al. . |
| 5,061,916 | 10/1991 | French et al. . |

Primary Examiner—Stephen Chin
Assistant Examiner—Kevin Kim
Attorney, Agent, or Firm—Lowe, Price, LeBlanc & Becker

[57] ABSTRACT

In a switched telecommunications network having multiple SPC switches connected to one another by trunks and connected to signal transfer points (STPs) by common channel signal (CCS) links, dual port protocol analyzer and control (DIAC) devices are situated at two STPs which are connected together by control and data communication links. One input of one of the DIAC device is connected through a first CCS link to a switch to be monitored and the second input of the DIAC device is connected via the data communication link to the second STP and from the second STP via a CCS link to the switch to be monitored to provide at the DIAC device a simultaneous presentation of CCS signals appearing at the terminations of the CCS links at the switch to be monitored.

17 Claims, 6 Drawing Sheets

SYSTEM AND METHOD FOR REMOTE TESTING AND PROTOCOL ANALYSIS OF COMMUNICATION LINES

CROSS REFERENCES TO RELATED APPLICATIONS

This application is related to co-pending applications Ser. Nos. 07/515,007 filed Apr. 26 1990; 07/646,319 filed Jan. 28, 1991 07/911,642 filed Jul. 10, 1992 and U.S. Pat. No. 4,998,240 issued Mar. 5, 1991, all commonly assigned with the present invention.

TECHNICAL FIELD

The present invention relates generally to remote testing of a plurality of telecommunications and the like data transfer communications lines, and more particularly to the remote and unattended protocol analysis of Common Channel Signaling (CCS) lines using Signaling System 7 (SS7) Protocol.

BACKGROUND ART

Assignee's U.S. Pat. No. 4,998,240 describes a method and apparatus for remote and unattended testing of customer ISDN lines at an unmanned central office using conventional protocol analyzer equipment. Related patent application Ser. No. 07/646,319 filed Jan. 28, 1991, describes a system and method for remotely testing a plurality of private data network communication lines using a conventional protocol analyzer. Two commercially available protocol analyzers for these purposes are the Bell Atlantic Remote ISDN Protocol Analyzer and the Bell Atlantic Test Systems ( BATS ) Network Analyzer. These are program controlled analyzers. Related Application Ser. No. 07/911,642, filed Jul. 10, 1992, describes a control and port selection arrangement which may be utilized with the BATS protocol analyzers to effect program controlled port selection and control functions is described in that application.

The present invention deals with the testing, monitoring and analyzing of control signaling in Stored Program Control (SPC) switched telephone, data and the like networks. Traditional control signaling in such networks, particularly SPC switched telephone networks has been on a per-trunk or in channel basis. With in channel signaling the same channel is used to carry control signals as is used to carry the call to which the control signals relate. Such signaling begins an the originating subscriber and follows the same path as the call itself.

In current telecommunications and data networks such in-channel signaling is being replaced with Common Channel Signaling (CCS) in which control signals are carried over paths completely independent of the voice channels. The common channel can be configured with the bandwidth required to carry control signals for a large variety of functions. Thus both the signaling protocol and the network architectures to support that protocol are more complex than in channel signaling.

CCS provides a method for exchanging information between Stored Program Control Systems (SPCs) that are inter-connected through a network of signaling links. CCS network nodes may include but are not limited to switching systems, network databases and operator service systems. The current common protocol for CCS is Specification of Signaling System 7 (SS7) which is described in Section 6.5, LSSGR, Issue 2, Jul. 1987, TR-TSY-000506, a module of TR-TSY-000064.

Figure 1:
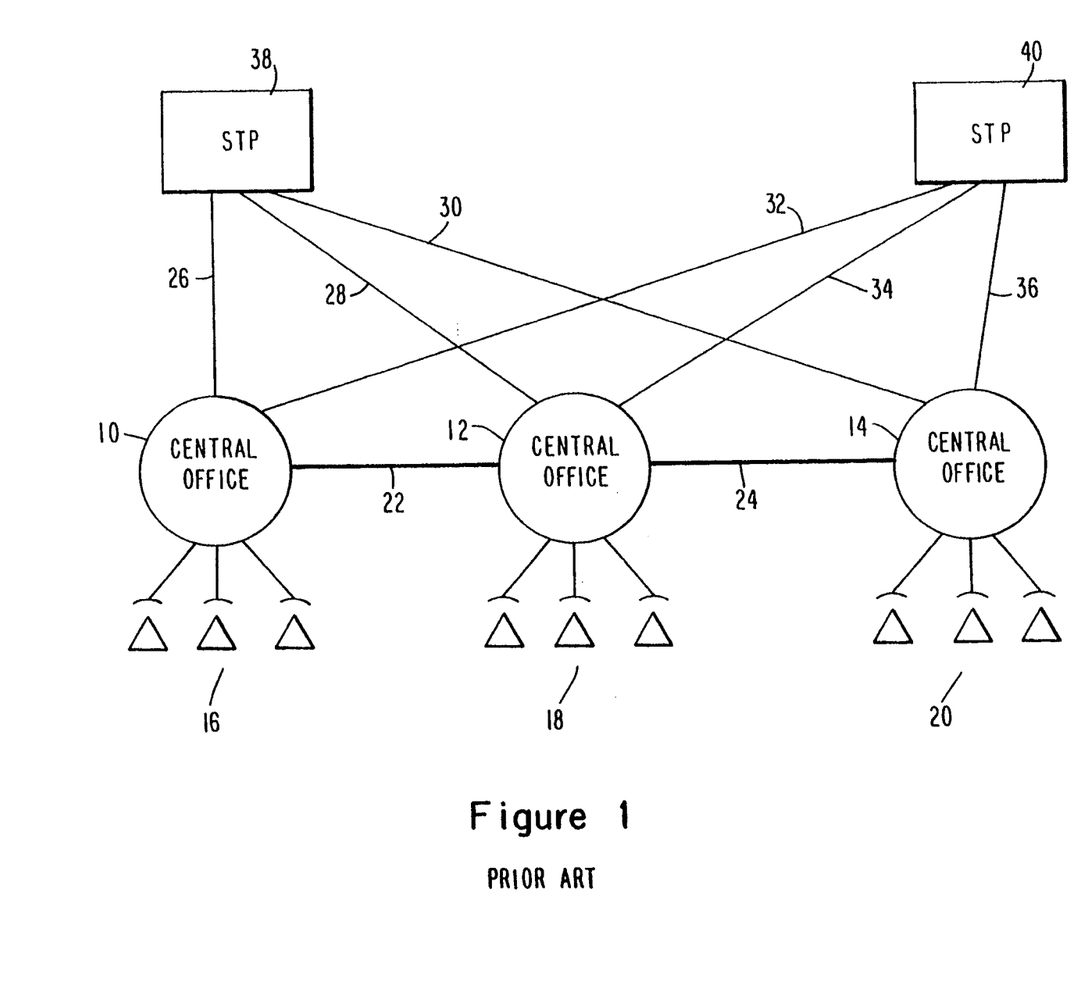
FIG. 1 is a diagrammatic illustration of a conventional stored program controlled (SPC) switched telephone network using SS7 protocol common channel signaling with paired signal transfer points (STPs).

Referring to FIG. 1 there is shown a simplified diagram of an SPC telephone network linking individual subscribers through Central Offices (COs) which are connected by trunks and linked by a typical CCS network. The COs typically consist of a programmable digital switch with CCIS communications capabilities such as an AT&T 5ESS or Northern Telecom DS-100 or the like and may or may not be equipped and programmed to serve as Service Switching Points (SSPs). In FIG. 1 series of central office switches 10, 12 and 14 are shown connected to groups of local subscribers 16, 18 and 20 by conventional local loops or subscriber lines. The COs 10, 12 and 14 are connected by trunk circuits 22 and 24, by way of example. Common Channel Signaling is provided by SS7 data links 26–36 extending between each CO and Signaling Transfer Points (STPs) 38 and 40. These local STPs may be connected to state or regional STPs, not shown.

A pair of STPs is conventionally provided per LATA to provide redundancy so that in the event of failure of one the other immediately assumes its load. Similarly, if one STP becomes overloaded the other shares the load to create a load balance. The paired STPs are connected by C-links so that each STP understands what the other is doing at all times. The STPs may be configured to continually share the load or may be configured in a hot and stand-by capacity. Generally speaking, one will basically monitor the other while they share the load. If one goes down the other is immediately aware of the situation via the C-link and picks up the load to avoid an outage.

Thus each of the COs 10, 12 and 14 are connected to each of the STPs 38 and 40. The STPs provide call processing data transfer between the various COs in the normal manner of SS7 common channel signaling.

In current usage of a CCS network of the type shown in FIG. 1, testing of the CCS or SS7 functioning must be carried out at the particular central office under surveillance in order to permit viewing both of the associated SS7 links at the same time, which is necessary to an effective test. This is ordinarily accomplished using a portable analyzer physically carried to the CO by maintenance personnel. It is only at this CO that the two SS7 links are physically accessible. However, that central office may be many miles distant so that the test may be not only delayed but also highly wasteful of personnel time. In addition, the results of on-site monitoring and collection of data often require more detailed analysis at the maintenance facility. Conveyance of such information to the facility in a timely manner may be costly and inconvenient and yet another trip to the malfunctioning CO may be required.

These problems and disadvantages are multiplied when a central office exhibits a recurring problem that requires extended attention. For example, in a case of network administration, a malfunction may be observed to occur frequently at the same time of day. To diagnose this a technician would have to personally attend the local site each day at the same time until the problem is diagnosed or, alternatively, remain at the site during the entire time of test. As an operating technician is required to be at the testing site, cost considerations restrict use to short, noncontinuous periods. Testing is normally done either on a routine basis or after identification of the existence of a problem whose exact nature is not yet known. Conventional protocol analysis is therefore limited in that it cannot practically be used to monitor the data stream of a selected circuit continuously over an extended period of time. In the absence of such extended monitoring there is no pragmatic way to detect the occurrence of a predefined condition and to initiate a control function upon recognition of such occurrence.

OBJECTS OF THE INVENTION

It is an object of the present invention to provide a system and method for effecting efficient and economical protocol and network analysis of common channel signaling links from a remote location.

Another object of the invention is to designate from a remote location one of a plurality of common channel signaling links to be accessed for protocol analysis.

Another object of the invention is to perform protocol analysis of common channel signaling links without requiring the presence of an operating technician at the analysis site.

Another object of the invention is to provide nonintrusive, continuous monitoring and storage of analysis data with the ability to automatically transmit the data to a specified remote location at specified times.

Yet another object of the invention is to provide the ability to define, from a remote location, a network transmission condition, the occurrence of which will be automatically detected, and in response to such detection, to automatically initiate a control function.

DISCLOSURE OF THE INVENTION

The above and other objects of the invention are satisfied, at least in part, by remotely testing dual CCS or SS7 access links simultaneously from a single transfer point on the CCS or SS7 network. In accordance with one feature of the invention a dual port protocol analyzer is situated at the site of each of two paired STPs for operation in a master and slave analyzer module capacity. These paired STPs may be referred to as STP A and STP B. A port selector associated with each dual port protocol analyzer has the port connections thereof connected to the STP interface with incoming/outgoing SS7 links.

A simultaneous test of paired SS7 links or lines is then performed from the control or master analyzer module at STP A by commanding the system to select the port or SS7 interface at STP A which is linked to the central office under test. This interface port is connected by the port connector of the protocol analyzer to one of the dual inputs of the analyzer to decode and display on that analyzer the SS7 data associated with the central office under test. The information may be outputted by the analyzer on a monitor or printer and may be recorded on a hard disc or other storage medium for later accessing.

However this constitutes only one half of the needed information. In order to obtain the other half the control module associated with the master protocol analyzer and control unit at STP A accesses the control module associated with the slave protocol analyzer and control unit located in the paired STP B. This access may be by any available connection such as a 2400 BAUD dial-up control link.

After this dial-up link is established the control module in the master analyzer and control unit at STP A commands the control module in the slave protocol analyzer and control unit at STP B to connect the CCS or SS7 link at STP B that is paired with the selected SS7 link and access port at STP A to dedicated DSO T1 carrier channels between STP A and STP B. The STP A end of these DSO channels terminates in the selected SS7 access port or interface at STP A which is connected to the other input port of the master dual port protocol analyzer and controller. This places the SS7 or other CCS control data from the central office under observation at both input ports of the master dual port protocol analyzer at STP A so that protocol monitoring may occur on both of the paired CCS or SS7 links of the CO under test from a centralized location, namely STP A.

This testing arrangement can be controlled in the local mode by personnel located at STP A where the master analyzer and control module is situated. Alternatively or the process may be reversed and the slave unit in STP B can become the master control unit and to provide diagnostics at that analyzer and STP. It is another feature of the invention that in the case no personnel are located in either STP both units can be remotely controlled from a centralized location via dial-up DDD access or by dedicated data circuit access. The monitor access points can be configured to provide V.35 or T1 carrier access at the STP.

Additional objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE PREFERRED EMBODIMENT

Figure 2:
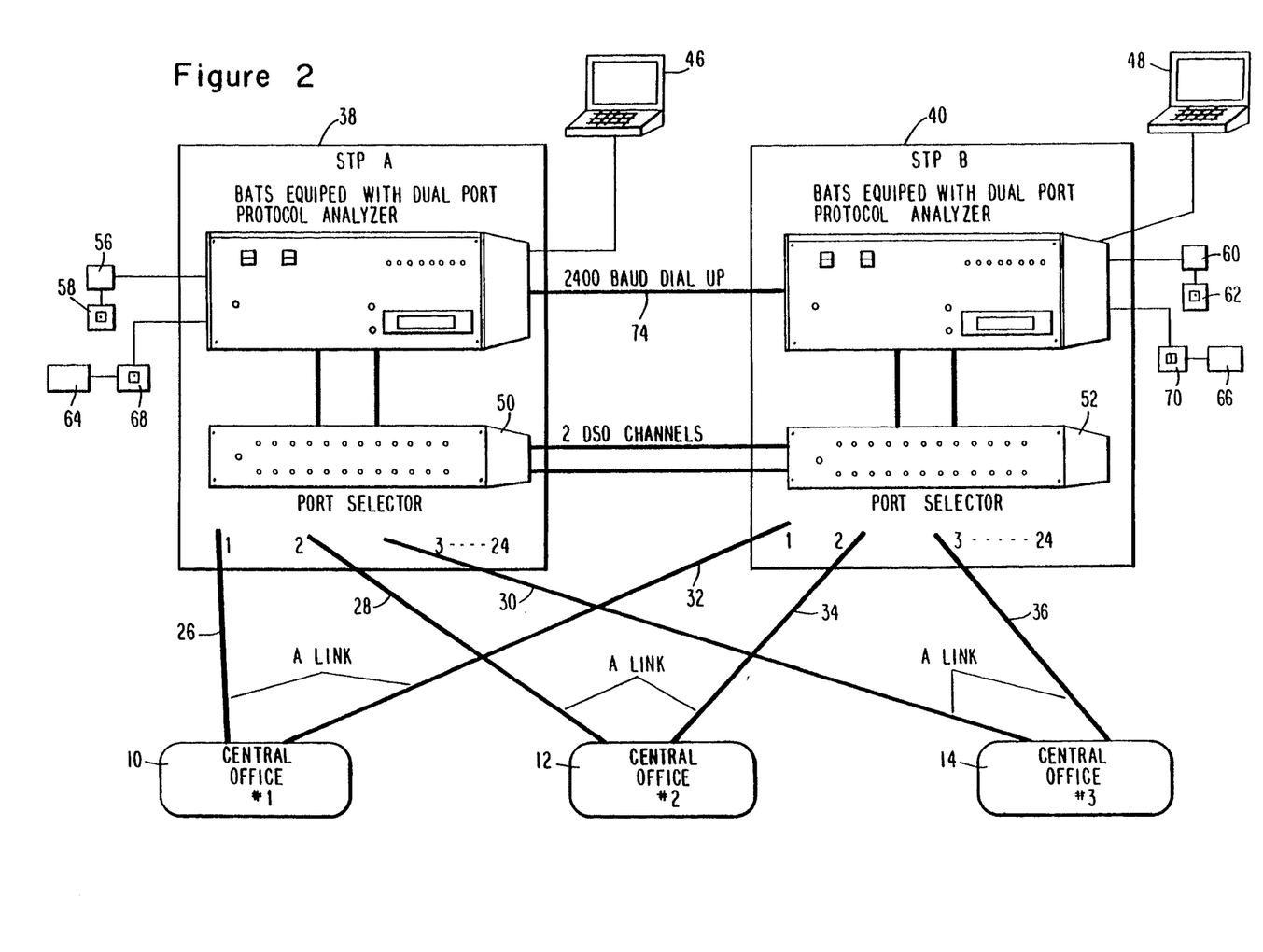
FIG. 2 is a simplified diagrammatic illustration of the network of FIG. 1 supplied with dual port protocol analyzers and control units at the STPs and disposed to effect monitoring and testing according to the preferred embodiment of the invention.

Referring to FIG. 2 there are shown three central offices Numbers 1, 2 and 3 corresponding to COs 10, 12 and 14 in FIG. 1. COs 1, 2 and 3 in FIG. 2 bear like reference numerals as in FIG. 1. The STPs 38 and 40 of FIG. 1 are shown as STP A and STP B respectively in FIG. 2. The STPs A and B are connected to the COs Numbers 1-3 by SS7 links 26-36 as in FIG. 1. At each of the STPs A and B there is provided a BATS dual port network analyzer. Each analyzer comprises a control module 42, 44 having associated monitors and keyboards 46, 48 and port selectors 50, 52. The control modules 42 and 44 each include a CPU and other PC components and also include a port selector and control circuit board of the type described in the common assignee's co-pending application Ser. No. 07/911,642 filed Jul. 10, 1992. That application is incorporated herein by reference. The port selector and control circuit board controls the port selector 50, 52.

This control board in conjunction with the port selector allows for the operate/non-operate control of up to 180 port relays in the port selectors 50 and 52 along with 8 switching control functions per board. While the port selectors shown in the drawings illustrate 24 port selections, it will be understood that this is by way of illustration only and that the port selector modules 50 and 52 may be stacked to provide up to 180 port relays per control board in the analyzer. Multiple control boards are usable with each analyzer so that the number of ports which may be accessed and/or controlled is very large.

The port selector and control board is controlled by software running under standard PC DOS or MS DOS as described in the said co-pending application. The control and selector board may be controlled completely from the keyboards 46 and 48, or through the use of commercially available software, such as PC Anywhere, the control and selection board can be controlled from a remote IBM or IBM-compatible computer.

The selector and control board is switch address selectable, allowing for the use of multiple control boards in the same IBM or IBM compatible computer. The maximum number of control boards that can be used in one IBM or IBM compatible computer depends upon the number of free expansion slots available in the computer and the number of available expansion slot addresses. In general it is possible to be able to use 4 to 5 such control boards in any IBM or IBM compatible computer, allowing for the control of up to 900 or more port relays and up to 40 simultaneous circuit control outputs.

The hardware design of the selector and control board allows for the 8 simultaneous circuit control outputs to be controlled by the software in any combination of outputs 0 through 7 (8 outputs), at a time or any combination of the 8, including all 8 at one time. The outputs latch to the desired state and will remain in that state until changed by the software or reset by the control output reset (resets all 8 control outputs to logic 0) or by the master selector board reset (resets all board outputs to logic 0).

The software normally allows for only one of the 180 port relay control outputs to be selected at a time. However in modified form the hardware design allows the software to select one port relay control. output for every 15 outputs. Therefore, up to 12 port relay control outputs may be controlled at the same time. The hardware design also allows each individual group of 15 port relay control outputs to be converted individually to 4 simultaneous circuit control outputs by unplugging one integrated circuit and plugging in a customer integrated circuit module in its place. In this situation, 15 port relay control outputs are sacrificed to gain 4 simultaneous circuit control outputs. A wide range of flexibility is thus provided.

The control unit 42 may also be connected via a modem 56 to telephone line access which is diagrammatically illustrated as a J11 jack 58. Remote control as well as remote read-out may be effected via this access. A similar modem and jack connection 60 and 62 are provided for the analyzer at STP B. The control units 42 and 44 also include facsimile output capability whereby data can be transmitted to remote facsimile machines 64 and 66 through telephone access lines indicated diagrammatically by J11 acks 68 and 70.

It is a feature of the invention that the system system illustrated in FIG. 2 may be used to simultaneously remotely access both SS7 Access links (A-links) that are routed to separate signal transfer points (STPs). This is done at an STP in a manner that allows the viewing of the SS7 or other CCS signaling data on both SS7 A-links at the same time. This is necessary in diagnostic work due to the fact that both the primary STP and the secondary STP may be involved in the handling of a single call. At the time that the analyzers are installed at the STPs it is necessary to connect the pertinent relay terminals in the port selectors 50, 52 to the various STP SS7 link interface ports 1-24 in FIG. 2. While only three central offices are illustrated it will be understood that a larger number are customarily handled by paired STPs. After the initial installation the test system is completely transparent and is non-intrusive during use.

Figure 3:
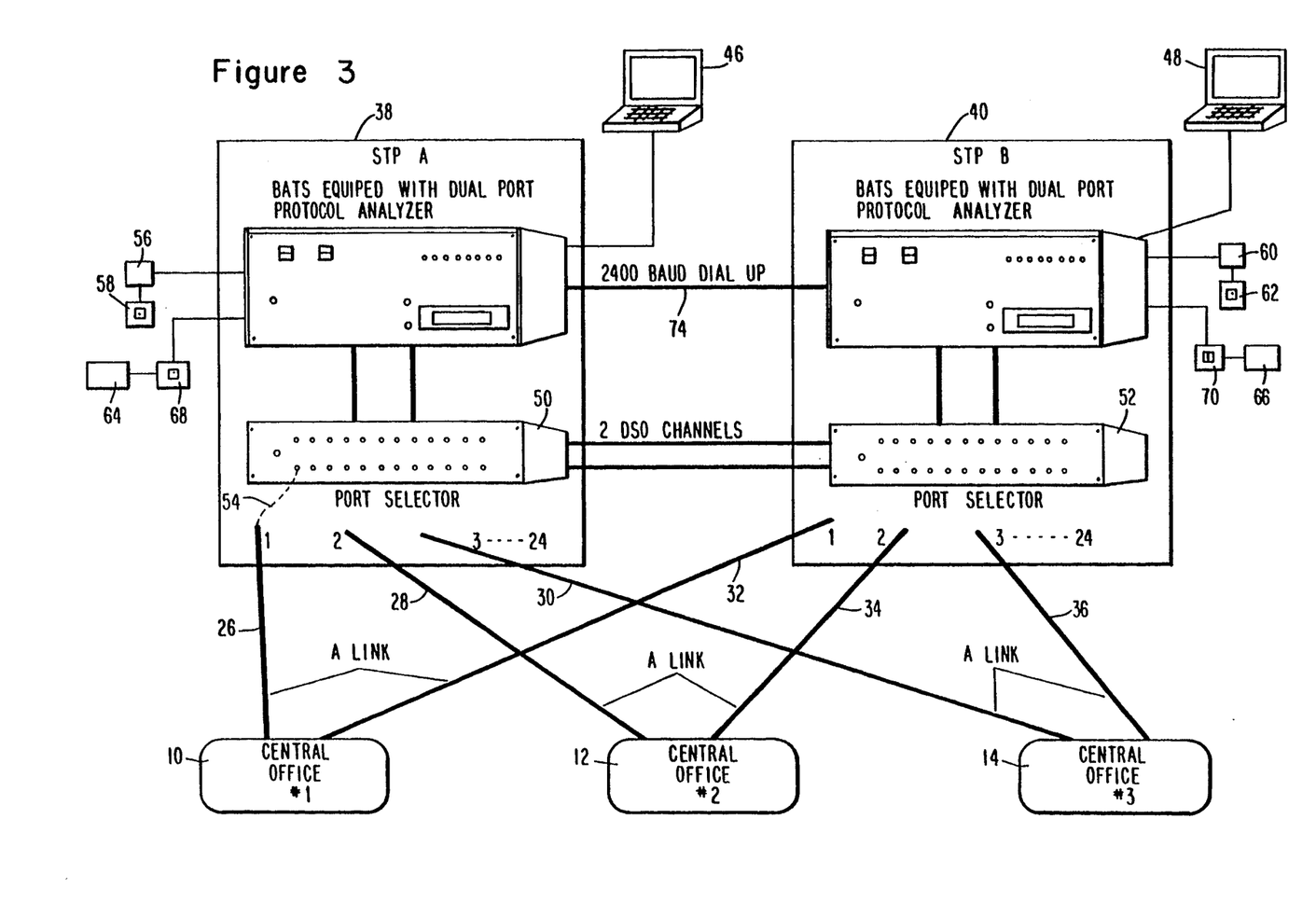
FIG. 3 is a reproduction of the arrangement illustrated in FIG. 2 showing the connection effected by operator selection of port Number 1 as an initial step to testing the functioning of the SS7 link to central office Number 1.
Figure 4:
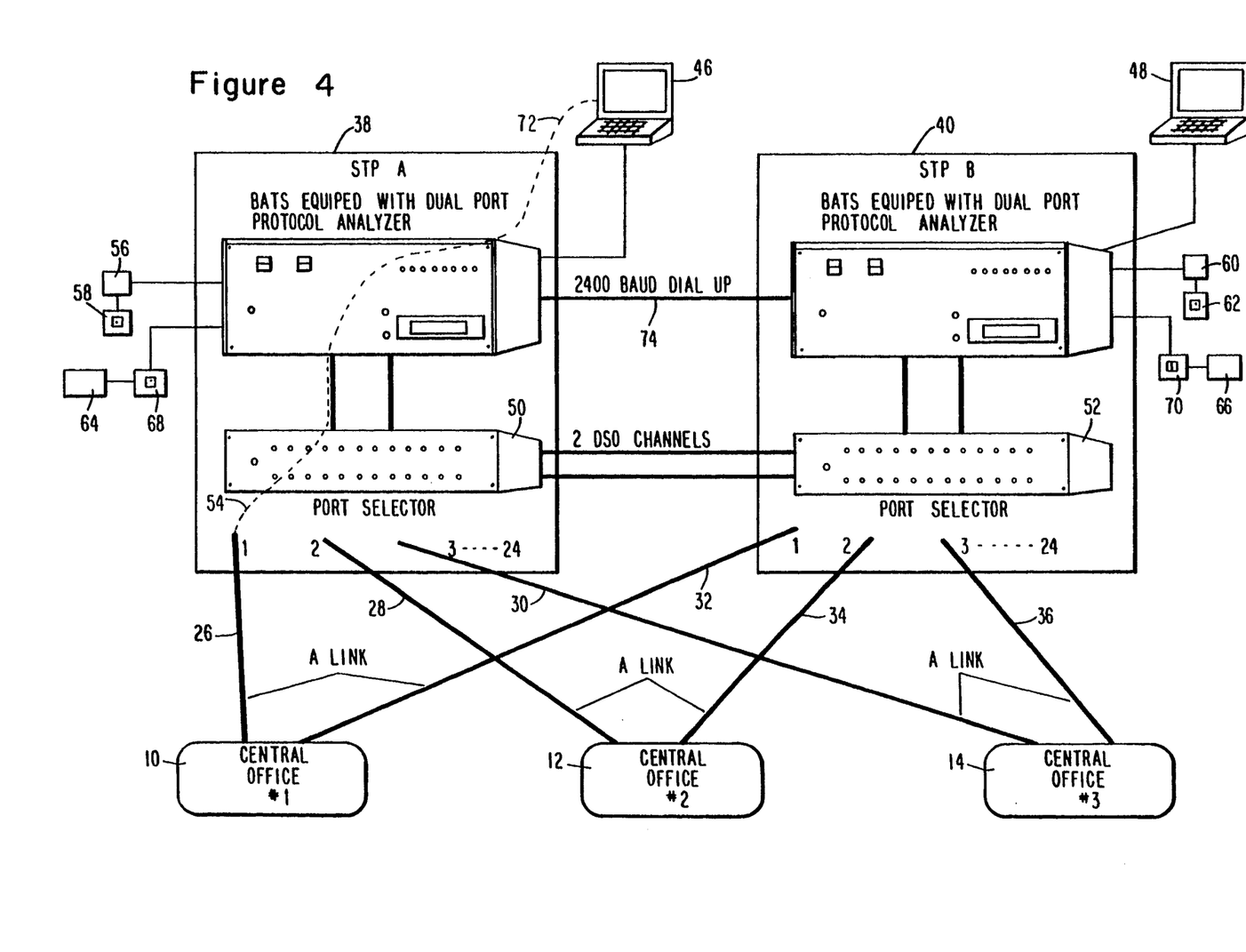
FIG. 4 is a reproduction of the arrangement illustrated in FIG. 2 showing the flow of test data from port Number 1 to the master protocol analyzer following the connection illustrated in FIG. 3.

According to the invention the system of FIG. 2 including the analyzers at STPs 38 and 40, STP A and STP B, may be used as follows:

The operator or technician at STP A commands the dual port protocol analyzer in STP A, including control module 42 and port selector 50, to select interface or port Number 1 which is connected to central office Number 1 as the central office selected for test in this illustrative example. This connection is indicated at 54 in FIG. 3. Port Number 1 and the SS7 A-link 26 are thus connected from central office Number 1 through the STP A port selector 50 and control module 42 to the monitor 46 for observation and monitoring. This path is illustrated graphically at 72 in FIG. 4. The operator may then observe the decoded display which represents the signal on SS7 A-link 26.

Figure 5:
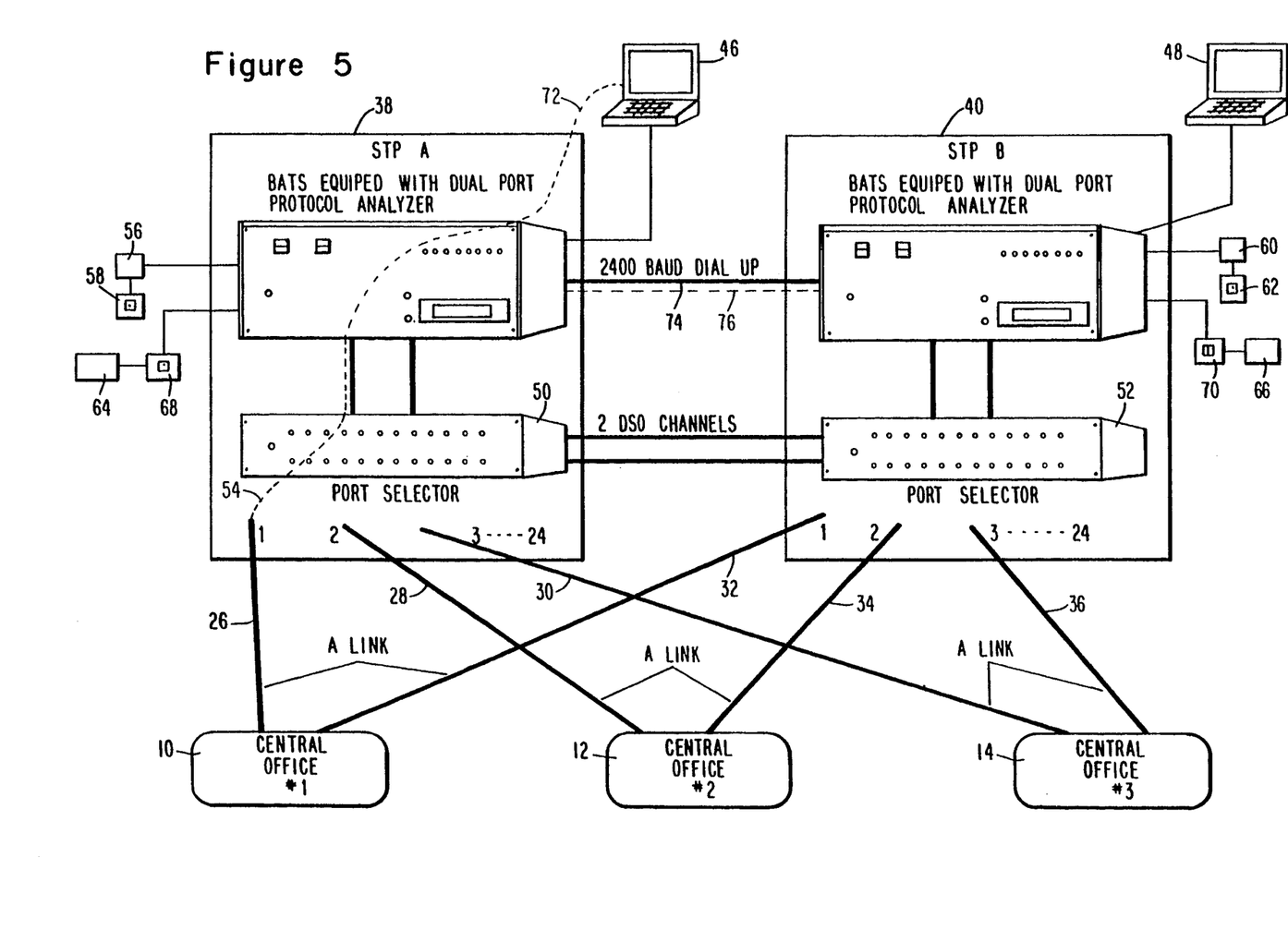
FIG. 5 is a reproduction of the arrangement illustrated in FIG. 2 showing the control module of the master analyzer accessing the slave protocol analyzer and port selector via a dial-up control link.

Having made this connection the control module 42 in STP A accesses the slave control module 44 in STP B via a telephone link such as the 2400 BAUD dial-up link 74. This connection is indicated by the broken line 76 in FIG. 5.

After the dial-up control link is established the control module 42 in STP A commands the control module 44 in STP B to establish a bridging connection between the A-link 32 connected to port Number 1 in STP B and an available data communication link between the two port selectors 50 and 52, such as two DSO channels from a T1 link 78. These two DSO channels would preferably be a dedicated circuit.

Figure 6:
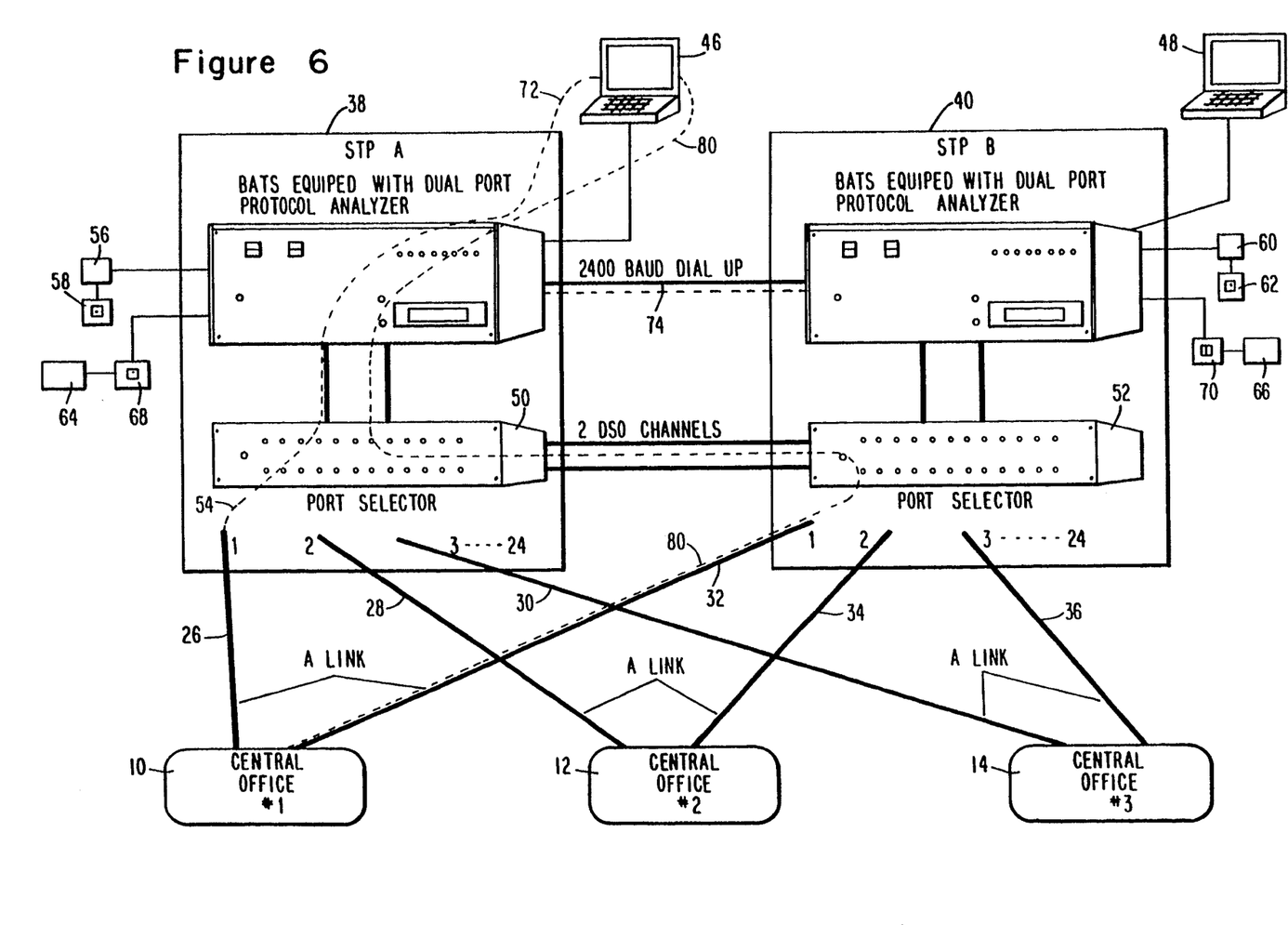
FIG. 6 is a reproduction of the arrangement illustrated in FIG. 2 showing the connection of the SS7 link from port Number 1 of STP B to the master protocol analyzer in STP A to provide an SS7 output on the second port of the dual port analyzer at STP A.

This creates a loop connection which is indicated at 80 in FIG. 6. The end of the 2 DSO channels terminating at STP A is connected via the master port selector 50 and master control unit 42 for decoding and display on the master monitor 46 at STP A. This simultaneously places the SS7 control data from central office Number 1 from both A-links at the two sets of terminals of the master dual port protocol analyzer an STP A so that monitoring may be accomplished on both A-links from a centralized location, namely the site of STP A and its analyzer.

This testing arrangement can be controlled in the local mode by personnel located in STP A or the process can be reversed and the slave unit in STP B can become the master control unit and allow diagnostics from STP B. In the case that no personnel are located in either STP A or STP B both units can be remotely controlled from a centralized location via dial-up DDD access or by dedicated circuit access.

The monitor access points can be configured to provide V.35 or T1 carrier access at the signal transfer point.

It will be apparent from the foregoing that the present invention provides a system and method for effecting efficient and economical protocol and network analysis of common channel signaling links from a remote location. The necessity for an operating technician at the analysis site is completely obviated. The invention provides a non-intrusive, continuous monitoring and storage of analysis data with the ability to automatically transmit the data to a specified remote location at specified times if desired. The remotely controlled testing may be effectuated using available equipment and telecommunication and data network links. Once installed the system and its operation are totally transparent to the network users.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. In a stored program control (SPC) switched communications network including multiple SPC switch means connected by trunk means for establishing communication paths between said switch means, and including common channel signal (CCS) links connecting each of said switch means to interface means at each of two signal transfer points (STPs), the method comprising:
   (a) providing dual input analyzer and control (DIAC) means at each of said two STPs;
   (b) providing control communication link means and data communication link means between said two STPs;
   (c) connecting an input of said DIAC means at a first STP to a CCS interface means at said first STP connected to a selected switch means to permit monitoring a first signal at said CCS interface means by said DIAC means at said first STP;
   (d) accessing the DIAC means at the second of said STPs from the DIAC means at said first STP via said control communication link means;
   (e) using said DIAC at said first STP and said control communication link means to cause said DIAC means at said second STP to connect to the CCS link between said second STP and said selected switch means via said data communication link means between said DIAC means to permit monitoring of a second signal on said CCS link connecting said second STP to said selected switch means for simultaneous monitoring of at least said first and second signals on said two CCS links connecting said selected switch means to said first and second STP.

2. A method according to claim 1 including the step of accessing the DIAC means at the second of said STPs from the DIAC means at said first STP via a dialup communications link.

3. A method according to claim 1 wherein steps (c), (d) and (e) are initiated from a site remote from said STP means.

4. A method according to claim 1 including the step of initiating (c), (d) and (e) from a PC means remote from said STPs and connected to said DIAC means at said STP via a dial-up link means.

5. In a stored program control (SPC) switched communications network including multiple SPC switch means connected by trunk means for establishing communication paths between said switch means, and including common channel signal (CCS) links connecting each of said switch means to interface means at each of two signal transfer points (STPs), the method comprising:
   (a) providing dual input analyzer and control (DIAC) means at each of said two STPs;
   (b) providing a dial-up communication link between said two STPs;
   (c) providing a data communication link means between said two STPs;
   (d) connecting an input of said DIAC means at a first STP to a CCS interface means at said first STP connected to a selected switch means to permit monitoring of a first signal at said CCS interface means by said DIAC means at said first STP;
   (e) accessing the DIAC means at the second of said STPs from the DIAC means at said first STP via said dial-up communication link;
   (f) using said DIAC means at said first STP and dial-up communication link to cause said DIAC means at said second STP to connect to the CCS link between said second STP and said selected switch means via said data communication link means between said two STPs to permit monitoring of a second signal on the CCS link connecting said second STP to said selected switch means for simultaneous monitoring of at least said first and second signals on said two CCS links connecting said selected switch means to said first and second STPs;
   (g) monitoring at said DIAC means CCS signals on said CCS links; and
   (h) initiating steps (d), (e), (f) and (g) from a site remote from said STP means.

6. In a stored program control (SPC) switched communications network including multiple SPC switch means connected by trunk means for establishing communication paths between said switch means, and including common channel signal (CCS) links connecting each of said switch means to interface means at each of two signal transfer points (STPs), the method at each of two signal transfer points (STPs), the method comprising:

(a) providing analyzer and control (AAC) means at each of said STPs, at least one of the AAC means being a dual input AAC (DI/AAC) means;

(b) providing multiple communication link means between said two STPs;

(c) connecting an input of said DI/AAC means at a first STP to the interface means at said STP for the CCS link to a selected switch means to permit monitoring of signals at said CCS interface by said DI/AAC means;

(d) accessing the AAC means at a second of said STPs from the DI/AAC means at said first STP via a selected one of said communication link means;

(e) signaling said AAC means at the second STP from said DI/AAC means at said first STP via said selected one of said communication link means to cause said AAC means to effect connection of the CCS interface means at said second STP connected to said selected switch means to said communication link means to establish a connection to an input of said DI/AAC means to permit monitoring of CCS signals on both of said CCS links to said selected switch means by said DI/AAC means.

7. A method according to claim 6 including the step of simultaneously monitoring on said DI/AAC means CCS signals on said CCS links.

8. A method according to claim 6 including the step of accessing the AAC means on a dial-up communication link means.

9. A method according to claim 6 wherein said AAC means is accessed and signaled via one communication link means and the CCS interface means at said second STP is connected to another communication link means.

10. A method according to claim 6 wherein both said AAC means are DI/AAC means to permit monitoring of CCS signals on said CCS links by either of said DI/AAC means.

11. A method according to claim 6 wherein steps (c), (d) and (e) are initiated from a site remote from said STPs.

12. A method according to claim 6 wherein steps (c), (d) and (e) are initiated from PC means located remotely from said STPs and connected to said DI/AAC means via a dial-up communications link.

13. In a stored program control (SPC) switched communications network including multiple SPC switch means connected by trunk means for establishing communication paths between said switch means, and including common channel signal (CCS) links connecting each of said switch means to interface means at each of two signal transfer points (STPs), the improvement comprising:

analyzer and control means associated with each of said STPs;

control communication link means between said STPs for connecting said analyzer and control means to one another;

data communication link means connecting said STPs;

at least one of said analyzer and control means having dual input means and being program controlled to connect an input of said analyzer and control means to a CCS interface means at the STP with which said analyzer and control means is associated to connect said input of said analyzer and control means to a selected switch means via a CCS link between said interface means and said switch means to permit said dual input analyzer and control means to monitor a signal on said CCS interface means at said STP;

said dual input program controlled analyzer and control means being connected to the analyzer and control means at the other of said STPs via said control communication link means;

said other analyzer and control means under control of said dual input program controlled analyzer and control means establishing at the STP associated with said other analyzer and control means a connection between said data communication link means and a CCS interface means at said other STP, which interface means is connected to a CCS link between said other STP and said selected switch means;

said data communication link means being connected at said first STP to an input means of said dual input means program controlled analyzer and control means whereby said dual input program controlled analyzer and control means is simultaneously connected via two CCS links to said selected switch means.

14. An SPC switched communications network according to claim 15 including computer control means remote from said STPs connected to said dual input program controlled analyzer and control means to control the actions of said dual input program controlled analyzer and control means responsive to said program.

15. In a stored program control (SPC) switched communications network including multiple SPC switch means connected by trunk means for establishing communication paths between said switch means, and including common channel signal (CCS) links connecting each of said switch means to interface means at each of two signal transfer points (STPs), the improvement comprising:

analyzer and control (AAC) means associated with each of said STPs, at least one of said AAC means being a dual input AAC (DI/AAC) means;

multiple communication link means between said two STPs;

said DI/AAC means being program controlled to connect an input of said DI/AAC means to a CCS interface means at the STP with which said DI/AAC means is associated to connect said input of said Di/AAC means to a selected switch means via a CCS link between said interface means and said switch means to permit said DI/AAC means to monitor a signal on said CCS interface means at said STP;

said DI/AAC means being connected to the AAC means at the other of said STPs via a selected one of said communication link means;

said AAC means under control of said DI/AAC means establishing at the STP associated with said AAC means a connection between said selected one of said communication link means and a CCS interface means at said other STP, which interface means is connected to a CCS link between said other STP and said selected switch means;

said selected one of said communication link means being connected at said first STP to an input means of said DI/AAC means whereby said DI/AAC means is simultaneously connected via two CCS links to said selected switch means.

16. A SPC switched communication network according to claim 15 wherein said DI/AAC means is connected to said AAC means via a dial-up communication link means to control said AAC means to establish a connection between said CCS interface means at said other STP is effected via a distinct communication link means.

17. In a stored program control (SPC) switched communications network including multiple SPC switch means connected by trunk means for establishing communication paths between said switch means, and including common channel signal (CCS) links connecting each of said switch means to interface means at each of two signal transfer points (STPs), the improvement comprising:

program controlled dual input analyzer and control means associated with each of said STPs;

dial-up communication link means between said STPs for connecting said analyzer and control means to one another;

data communication link means connecting said STPs;

means at a first of said analyzer and control means to cause connection of an input of said analyzer and control means to a CCS interface means at the STP with which said first analyzer and control means is associated to connect said input of said first analyzer and control means to a selected switch means via a CCS link between said interface means and said switch means to permit said first analyzer and control means to monitor a signal on said CCS interface means at said STP;

means at said first analyzer and control means to cause connection of said first analyzer and control means to the second of said analyzer and control means at the other of said STPs via said dial-up communication link means;

means at said first analyzer and control means to cause at the STP associated with said second analyzer and control means a connection between said data communication link means and a CCS interface means at said other STP, which interface means is connected to a CCS link between said other STP and said selected switch means;

means at said first analyzer and control means to cause said data communication link means to be connected at said first STP to the other of said input means of said dual input analyzer and control means so that said first analyzer and control means is simultaneously connected via two CCS links to said selected switch means;

and a dial-up communication link means connected to said first analyzer and control means and a station remote therefrom, said first analyzer and control means being controlled from said remote location.

* * * * *